United States Patent
Eskra et al.

(10) Patent No.: US 11,050,121 B2
(45) Date of Patent: Jun. 29, 2021

(54) SYSTEM AND METHOD FOR FABRICATING AN ELECTRODE WITH SEPARATOR

(71) Applicant: Eskra Technical Products, Inc., Saukville, WI (US)

(72) Inventors: Michael David Eskra, Saukville, WI (US); Paula Margaret Ralston, Frederick, MD (US)

(73) Assignee: Eskra Technical Products, Inc., Saukville, WI (US)

( * ) Notice: Subject to any disclaimer, the term of this patent is extended or adjusted under 35 U.S.C. 154(b) by 879 days.

(21) Appl. No.: 15/062,883

(22) Filed: Mar. 7, 2016

(65) Prior Publication Data

US 2016/0240829 A1   Aug. 18, 2016

Related U.S. Application Data

(63) Continuation-in-part of application No. 13/617,162, filed on Sep. 14, 2012.

(60) Provisional application No. 61/647,773, filed on May 16, 2012.

(51) Int. Cl.
| | |
|---|---|
| *H01M 50/46* | (2021.01) |
| *H01M 50/403* | (2021.01) |
| *H01M 50/446* | (2021.01) |
| *H01M 10/052* | (2010.01) |

(52) U.S. Cl.
CPC ......... *H01M 50/46* (2021.01); *H01M 50/403* (2021.01); *H01M 50/446* (2021.01); *H01M 10/052* (2013.01)

(58) Field of Classification Search
CPC .......................... H01M 2/145; H01M 2/1673
See application file for complete search history.

(56) References Cited

U.S. PATENT DOCUMENTS

| | | |
|---|---|---|
| 2,304,073 A | 12/1942 | Brennan |
| 3,323,934 A | 6/1967 | Point |
| 5,447,806 A | 9/1995 | Hoge et al. |

(Continued)

FOREIGN PATENT DOCUMENTS

| | | |
|---|---|---|
| JP | 2001-351616 A | 12/2001 |
| JP | 2011-077014 A | 4/2011 |

(Continued)

OTHER PUBLICATIONS

Barletta et al., "Electrostatic Spray Deposition (ESD) of Polymeric Powders on Thermoplastic (PA66) Substrate," Elsevier, Science Direct, Surface & Coatings Technology, vol. 201, Jan. 5, 2006, pp. 296-308.

*Primary Examiner* — Joel G Horning
(74) *Attorney, Agent, or Firm* — Ziolkowski Patent Solutions Group, SC

(57) ABSTRACT

A system and method for providing a ceramic-based separator onto an electrode is disclosed. A separator is formed on the electrode via a dry, solvent-free application of a ceramic-based separator to the electrode. An electrode is provided to an application area via a feed mechanism and a separator layer is then applied to the electrode that is comprised of a binder including at least one of a thermoplastic material and a thermoset material and an electrically non-conductive separator material, with the separator layer being applied to the electrode via a dry dispersion application.

2 Claims, 8 Drawing Sheets

(56) References Cited

U.S. PATENT DOCUMENTS

| | | |
|---|---|---|
| 5,738,905 A | 4/1998 | Bevers |
| 5,840,444 A | 11/1998 | Takeshima et al. |
| 5,922,493 A | 7/1999 | Humphrey, Jr. et al. |
| 6,020,089 A | 2/2000 | Harada et al. |
| 6,033,722 A | 3/2000 | Koike et al. |
| 6,623,793 B2 | 9/2003 | Mushett et al. |
| 6,667,000 B1 | 12/2003 | Nakazato et al. |
| 6,833,009 B2 | 12/2004 | Gonzalez et al. |
| 7,077,932 B2 | 7/2006 | Ozaki et al. |
| 7,102,877 B2 | 9/2006 | Mitchell et al. |
| 7,295,423 B1 | 11/2007 | Mitchell et al. |
| 7,342,770 B2 | 3/2008 | Mitchell et al. |
| 7,352,558 B2 | 4/2008 | Zhong et al. |
| 7,384,433 B2 | 6/2008 | Mitchell et al. |
| 7,492,571 B2 | 2/2009 | Zhong et al. |
| 7,495,349 B2 | 2/2009 | Mitchell et al. |
| 7,508,651 B2 | 3/2009 | Mitchell et al. |
| 7,604,842 B2 | 10/2009 | Shida et al. |
| 7,722,686 B2 | 5/2010 | Xi et al. |
| 7,791,860 B2 | 9/2010 | Mitchell et al. |
| 7,791,861 B2 | 9/2010 | Zhong et al. |
| 7,882,622 B2 | 2/2011 | Polsonetti et al. |
| 7,883,553 B2 | 2/2011 | Mitchell et al. |
| 7,935,155 B2 | 5/2011 | Mitchell et al. |
| 8,048,478 B2 | 11/2011 | Hirokawa et al. |
| 8,072,734 B2 | 12/2011 | Zhong et al. |
| 8,192,869 B2 | 6/2012 | Teramoto |
| 8,591,601 B2 | 11/2013 | Zhong et al. |
| 8,815,443 B2 | 8/2014 | Mitchell et al. |
| 2003/0205835 A1 | 11/2003 | Eastin et al. |
| 2003/0228520 A1 | 12/2003 | Kaun |
| 2004/0029008 A1 | 2/2004 | Winterberg et al. |
| 2005/0266298 A1 | 12/2005 | Mitchell et al. |
| 2005/0271798 A1 | 12/2005 | Zhong et al. |
| 2005/0285080 A1 | 12/2005 | Suzuki et al. |
| 2006/0006063 A1 | 1/2006 | Tanaka et al. |
| 2006/0109608 A1 | 5/2006 | Zhong et al. |
| 2006/0133013 A1 | 6/2006 | Xi et al. |
| 2006/0134518 A1 | 6/2006 | Kogetsu et al. |
| 2006/0137158 A1 | 6/2006 | Zou et al. |
| 2006/0147712 A1 | 7/2006 | Mitchell et al. |
| 2006/0153972 A1 | 7/2006 | Hirokawa |
| 2006/0230962 A1 | 10/2006 | Inukai et al. |
| 2006/0246343 A1 | 11/2006 | Mitchell et al. |
| 2007/0122698 A1 | 5/2007 | Mitchell et al. |
| 2007/0160909 A1 | 7/2007 | Sasaki et al. |
| 2007/0190424 A1 | 8/2007 | Mitchell et al. |
| 2008/0026294 A1* | 1/2008 | Jiang .................... H01M 2/166 429/246 |
| 2008/0092808 A1 | 4/2008 | Mitchell et al. |
| 2008/0102371 A1 | 5/2008 | Mitchell et al. |
| 2008/0117565 A1 | 5/2008 | Zhong et al. |
| 2008/0145762 A1 | 6/2008 | Adachi et al. |
| 2008/0199781 A1 | 8/2008 | Lunt et al. |
| 2008/0204973 A1 | 8/2008 | Zhong et al. |
| 2009/0029261 A1 | 1/2009 | Thomas-Alyea et al. |
| 2009/0098459 A1 | 4/2009 | Takezawa et al. |
| 2009/0176151 A1 | 7/2009 | Kim |
| 2009/0193648 A1 | 8/2009 | Inda |
| 2009/0197178 A1 | 8/2009 | Inda |
| 2009/0239127 A1 | 9/2009 | Xi et al. |
| 2009/0242507 A1 | 10/2009 | Ando et al. |
| 2009/0321678 A1 | 12/2009 | Zhong et al. |
| 2010/0014215 A1 | 1/2010 | Zhong et al. |
| 2010/0033898 A1* | 2/2010 | Zhong .................. C04B 35/532 361/502 |
| 2010/0033901 A1 | 2/2010 | Mitchell et al. |
| 2010/0055569 A1 | 3/2010 | Divigalpitiya et al. |
| 2010/0099029 A1 | 4/2010 | Kinoshita et al. |
| 2010/0110613 A1 | 5/2010 | Zhong et al. |
| 2010/0263910 A1 | 10/2010 | Mitchell et al. |
| 2010/0323244 A1 | 12/2010 | Chiang et al. |
| 2011/0031935 A1 | 2/2011 | Miyoshi et al. |
| 2011/0135987 A1 | 6/2011 | Shin |
| 2011/0143018 A1 | 6/2011 | Peng et al. |
| 2011/0143019 A1 | 6/2011 | Mosso et al. |
| 2011/0165318 A9 | 7/2011 | Zhong et al. |
| 2011/0206974 A1 | 8/2011 | Inoue et al. |
| 2011/0274828 A1 | 11/2011 | Nagamatsu |
| 2011/0311855 A1 | 12/2011 | Peng et al. |
| 2012/0040243 A1 | 2/2012 | Zhong et al. |
| 2013/0189577 A1 | 7/2013 | Wang et al. |
| 2013/0218241 A1 | 8/2013 | Savoy et al. |
| 2013/0260019 A1 | 10/2013 | Sugie |
| 2013/0273407 A1* | 10/2013 | Kylyvnyk ........... H01M 2/1673 429/144 |
| 2013/0309414 A1 | 11/2013 | Eskra et al. |
| 2014/0030590 A1 | 1/2014 | Wang et al. |
| 2014/0178603 A1 | 6/2014 | Shieh |
| 2014/0295095 A1 | 10/2014 | Langlois et al. |
| 2016/0056437 A1 | 2/2016 | Huang et al. |

FOREIGN PATENT DOCUMENTS

| | | |
|---|---|---|
| JP | 2011-216227 A | 10/2011 |
| JP | 2012-009170 A | 1/2012 |
| JP | 2014-041793 A | 3/2014 |
| KR | 20080082289 A | 9/2008 |
| WO | 2005008807 A2 | 1/2005 |

\* cited by examiner

SYSTEM AND METHOD FOR FABRICATING AN ELECTRODE WITH SEPARATOR

CROSS-REFERENCE TO RELATED APPLICATION

The present application a continuation-in-part of, and claims priority to, U.S. patent application Ser. No. 13/617,162, filed Sep. 14, 2012, which is a non-provisional of, and claims priority to, U.S. Provisional Application 61/647,773 filed May 16, 2012, the disclosures of which are incorporated herein in their entirety.

GOVERNMENT RIGHTS IN THE INVENTION

The U.S. Government has a paid-up license in this invention and the right in limited circumstances to require the patent owner to license others on reasonable terms as provided for by the terms of SP4701-09-D-0049 CLIN 0002 and HQ0147-140-C-8307 awarded by Defense Logistics Agency.

BACKGROUND OF THE INVENTION

Embodiments of the invention relate generally to a dry, solvent-free method and apparatus for fabricating electrodes and, more particularly, to a method and apparatus for forming separator layer on an electrode.

Typically, power sources, such as batteries, capacitors and fuel cells contain a positive and negative electrode. Depending on the chemistry of the power source, manufacturing methods vary. Many methods, such as those used in the Li-ion industry, include mixing active materials, conductive materials and binders in a wet slurry, using a solvent, and applying to a substrate. The application may be via doctor blade, roll transfer coating, slot die or extrusion.

The cast electrodes are then dried in ovens, while the solvent is recaptured so as not to allow fumes to escape into the environment, or the solvent is used as supplemental fuel for the drier. This process is time-consuming and expensive. The ovens are usually very large, long, expensive and space-consuming as well. The solvents are typically flammable, hard to remove from the chemical structure, bad for the environment, and costly to handle correctly, both environmentally and from a safety perspective. If solvent recovery is desired the solvent needs to be captured, condensed, cleaned and prepared for reuse or disposal.

Some known methods of power source manufacturing have moved away from solvent slurries on one electrode, but typically still use a solvent-based method on the other electrode. The non-solvent method usually includes pressing or extruding a mix of active materials, conductive materials and binder into an electrode, which then is attached to a substrate or current collector. Present day manufacturing techniques therefore limit throughputs, and the cost of such electrodes can be excessive.

The electrodes made through the solvent casting and subsequent extraction typically exhibit good adhesion to the current collector when the dried electrode is mechanically coined. The act of solvent casting and subsequent extraction leaves the binder and electrode structure open, similar to that of a sponge structure. The coining operation crushes the electrode structure back down leaving a porosity of 30 to 50%. Upon wetting with the electrolyte this crushed sponge-like structure relaxes and exhibits what is commonly referred to as swelling of the electrode. The typical anode binder, known as PVDF-Polyvinylidene fluoride or polyvinylidene difluoride (PVDF), is a highly non-reactive and pure thermoplastic fluoropolymer produced by the polymerization of vinylidene difluoride. It is one of the few known binders that do not readily react at the lithium potential of the anode and thus is typically preferred as a binder in Li-ion batteries.

Some manufactures have tried to develop processes using polytetrafluoroethylene (PTFE) and fibrillating the binder as to create a free standing film. This active material loaded free standing film is then pressed onto a current collector to be made into an electrode. PTFE is not stable at the Lithium ion anode potential so its use is limited to that of a cathode binder. Other manufacturers have tried to use water based binders to create the lithium electrode structure. They have difficulty with drying the electrode thoroughly to prevent the moisture reacting with the lithium salts, detrimentally affecting the performance of the resulting battery.

Thus, the preferred method of fabricating Li-ion batteries typically includes a solvent-based method, for at least one electrode, that meet demanding performance requirements, while also meeting demanding and rigorous life requirements (by exhibiting adequate adhesion to the base material). However, because of the costs associated with handling, reclaiming, and ultimately disposing of these environmentally challenging solvents, the cost of manufacturing Li-ion and other solvent-based electrodes can be excessive.

Battery fabrication also includes application of a battery separator to electrodes of the battery, with the battery separator being placed between a battery's anode and cathode to keep the two electrodes apart to prevent electrical short circuits while also allowing the transport of ionic charge carriers that are needed to close the circuit during the passage of current in an electrochemical cell. It is recognized that numerous drawbacks are associated with existing battery separator fabrication and application methods. That is, for batteries with a small cell area and a large number of stacked electrodes, challenges arise with respect to alignment and stacking during assembly, as well as shorting issues, therefore causing overall cell yield to be lower. Tabbing of individual electrodes and separator placement present challenges in manufacturing the battery, with techniques such as heat staking the separator on the edges of the electrode being helpful but not fully addressing the challenge of overall alignment and shorting.

In a typical battery separator fabrication and application method, the battery separator is formed as a stand-alone sheet/layer that is formed via mixture of a separator material with pour-forming oil and a subsequent blow, cast, and extraction/calendaring process to leave the separator as a micro-porous body. A ceramic separator uses a polyolefin base material with ceramic particles added to the base material to result in a high polymer (15-35%) loaded ceramic separator. The separator material is stored on a roll and subsequently requires further slitting and cutting-to-size to produce a separator for each specific cell and battery type, with the slit/cut separator then being aligned and applied to the cell/battery during the actual manufacturing thereof.

Therefore, it would be desirable to provide a solvent-free method and apparatus for fabricating electrodes. It would also be desirable for provide a method for applying a separator directly to the electrodes, so as to eliminate additional slitting, cutting-to-size and alignment steps associated with separator preparation and application.

BRIEF DESCRIPTION OF THE INVENTION

The invention is a directed method and apparatus for fabricating electrodes and, more particularly, for forming ceramic-based separators for electrodes.

According to one aspect of the invention, a method of applying a dry, solvent-free ceramic-based separator to an electrode includes providing an electrode to an application area via a feed mechanism and applying a separator layer comprised of a binder and an electrically non-conductive separator material to the electrode via a dry dispersion application, wherein the binder includes at least one of a thermoplastic material and a thermoset material.

According to another aspect of the invention, a method of manufacturing a battery cell that includes an electrode and a separator includes providing an electrode, advancing the electrode toward an application region, and coating a mixture of an electrically non-conductive ceramic-based separator material and a binder onto the electrode in the application region via a dry, solvent-free coating process, so as to form a separator layer.

According to yet another aspect of the invention, a battery cell includes an electrode and a separator layer adhered to the electrode, the separator layer comprising a binder comprising at least one of a thermoplastic material and a thermoset material and an electrically non-conductive ceramic-based separator material, wherein the separator layer ranges from 2-30% binder by weight.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

According to embodiments of the invention, electrodes for energy storage devices, such as lithium ion batteries, are fabricated using a solvent-free method and apparatus, and a separator layer is applied to the electrodes via a dry dispersion process.

Figure 1:
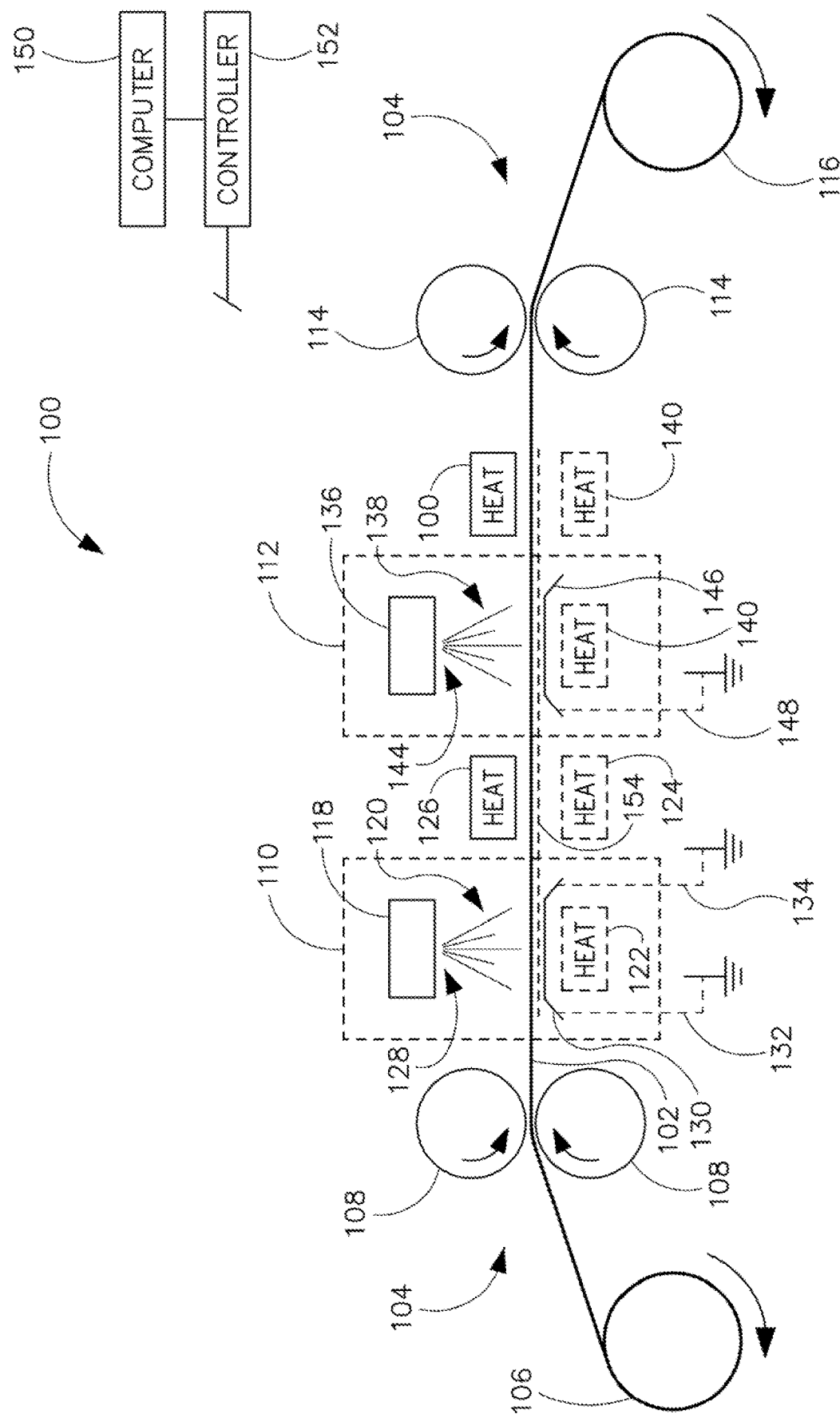
FIG. 1 illustrates components of a system for forming active electrode materials on an electrode substrate, according to an embodiment of the invention.

FIG. 1 illustrates a system 100 for fabricating electrodes by depositing binder and active electrode material on one side of a substrate 102 (otherwise known as a current collector in a finished electrode). The substrate 102 can include in one example copper as an anode current collector or aluminum as a cathode current collector. In another example, the anode current collector is a composite that includes for instance steel. As other examples, substrate 102 could also include but is not limited to a nickel plated steel, a composite of fibrous carbon, a tin dioxide ($SnO_2$), and could be for instance a punched solid sheet or an expanded composite (i.e., having perforations that allow for an open expansion of the substrate to reduce weight or allow higher mechanical or material loading). However, the invention is not so limited and any substrate or collector material may be used to form an electrode having other active material(s), according to what is known in the art. The active material or active material mixture includes but is not limited to lithium titanate oxide (LTO), cobalt oxide, nickel oxide, manganese oxide, nickel cobalt manganese oxide, iron phosphate, iron oxide, carbon, and silicon.

Substrate 102 is fed through a feed mechanism or roller system 104 having a feed mandrel 106 that provides material for substrate 102 and which is guided by oppositely rotating guide mandrels 108. In embodiments of the invention, substrate 102 may be a single sheet of electrode, or may be a continuous feed thereof. Substrate 102 is fed through a first application region 110 and through a second application region 112 during which time mixes that may include binder, active material, and conductive material are applied or otherwise sprayed onto substrate 102. Heat is applied within application regions 110, 112, and/or after passing therethrough as will be further described, in order to effect binding and formation of electrode materials. Substrate is passed through a second set of guide mandrels 114 that guide the substrate, having active electrode material bound thereto, toward a collection mandrel 116. According to the invention, second set of guide mandrels 114 may be designed having a space or gap therebetween that is maintained during operation in order to compress substrate 102 having the electrode thereon to a final desired and consistent thickness.

First application region 110 includes a device 118 for applying a first layer to substrate 102 that includes a spray mechanism (such as a spray gun or other known devices for causing a spray) that is configured to spray 120 a first or base layer of a mix of material onto substrate 102. In general, although first application region 110 is described as having a spray mechanism or gun in order to apply material onto the substrate, and such is illustrated as "spray 120", it is contemplated that any mechanism may be used to apply the material, to include painting, brushing, powder coating, using a fluidized bed, doctor blading, or wiping with a rag, as examples. In fact, in this and all subsequent application regions described, it is contemplated that a spray gun or other known spray device may be employed for applying first and subsequent layers to the substrate 102, or any mechanism may be used to apply the materials, as described above, and that the term "spray" may be applied to any mechanism or means that are used to apply a liquid to a surface.

According to the invention, device or spray mechanism 118 causes spray 120 to emit between approximately 2 and 20 psi. According to the invention, spray 120 includes a mix of binder, conductive carbon, and active electrode material. The binder, according to one embodiment, includes a thermoplastic or a thermoset material, which in one embodiment is polyvinylidene fluoride (PVDF) ranging between 6-85% by weight of the total material in spray 120. However the invention is not to be so limited, and for instance binder levels as low as 1% or as high as 100% may be used. Further, the invention is not limited to PVDF, but may include any binder that is known within the art that include, according to embodiments of the invention and as stated, thermoplastics and thermoset materials. As known in the art, thermoplastics are a polymer that becomes pliable above a certain temperature, and returns to a solid stated upon cooling. In contrast and as also known in the art, a thermoset material forms an irreversible chemical bond during the curing process, which breaks down upon melting (and does not reform upon cooling). According to embodiments of the invention, the binder may be PVDF or any derivative thereof, or PTFE or any derivative thereof, as examples. According to another embodiment of the invention, a very high molecular weight polyethylene material may be included in the binder to add structural integrity to the binder. The conductive carbon, as known in the art, may be included in order to cause or enhance electrical contact between particles within the electrode.

Spray 120 may also includes generally 4-8% conductive carbon to include a graphite such as TIMREX® KS6 (TIMREX is a registered trademark of Timcal SA of Switzerland) (although increased amounts of conductive carbon to 17% or higher and up to, for instance, 40% may be used, according to the invention). The balance % of spray 120 is active electrode materials which include but are not limited to LTO, cobalt oxide, nickel oxide, manganese oxide, nickel cobalt manganese oxide, iron phosphate, iron oxide, carbon, and silicon. As one example, spray 120 includes 13% binder and 8% conductive carbon, and the balance of spray 120 is 79% active material, by weight.

According to the invention, spray 120 deposited upon substrate 102 within first application region 110 is heated in order to initiate binding of the first layer mix to substrate 102. In one embodiment, a heater 122 is positioned opposite device 118 and adequate power is provided to heater 122 to raise the temperature of substrate to between approximately 100° F. and 500° F., and in one embodiment to 300° F. However, in another embodiment, a heater 124 is positioned to heat a surface of substrate 102 opposite a surface of substrate 102 to which spray 120 is applied. In this embodiment as well, heater 124 is powered to raise the temperature of substrate to between approximately 100° F. and 500° F., and in one embodiment to 300° F. Heat may also be applied, in one embodiment, via a heater 126 to the base layer after passing through first application region 110 at least until the first layer reaches a plastic state, after which the first layer may be allowed to cool prior to applying a subsequent layer of electrode material. Thus, according to the invention, a first layer or base layer of electrode material is applied to substrate 102 and binding thereto is initiated via one or both heaters 122, 124. The binder of base layer may also be melted throughout using heater 126 in order to cause the base layer to melt and uniformly form on substrate 102. Heaters 122, 124, and 126 may apply heat through any number of known mechanisms. For instance, heaters 122-126 may include infrared (IR) heaters, convective heaters, conductive heaters, radiant heaters (for instance, outside the IR spectrum), or induction heaters, as examples.

Heaters 122/124 and heater 126 generally serve different purposes. For instance, heaters 122/124 provide heat that is directed toward the substrate 102 in order that the binder material in contact with substrate 102 is caused to change to a plastic state (but not heated to the point that the binder readily melts and flows) to adhere to substrate 102. Heater 126, on the other hand, is generally directed toward heating the bulk of the sprayed material that forms the base layer. In such fashion, according to the invention, heat may be provided to either side of substrate 102, and heaters 122 and 124 may be provided at different locations relative to device 118, depending on such factors as the amount of binder in spray 120. Thus, different types of heaters may be used for the different desired type of heating to be performed. For instance, heaters 122 and/or 124 may be induction heaters that cause primarily substrate 102 to heat, while heater 126 may be an IR, convective, or radiant heater. In another example, one or all heaters (122 and/or 124 and 126) are IR heaters. In fact, any combination of heaters may be used, according to the invention, depending on the desired type of heating to be performed (substrate versus a layer of applied material)

As known in the art, it is generally desired to maximize the amount of active material within the electrode. Thus, it is also desired to minimize the amount of binder used in spray 120, however under the constraining guideline that adequate binding be obtained in the base layer sprayed onto substrate 102 in first application region 110. Binding of the first layer of sprayed material 120 is affected by not only the types of heaters, temperatures obtained, and the like, but also by the amount of binder, conductive carbon, and active material present in spray 120. As known in the art, particle size may be actively selected based on the type of electrode to be formed, and may range from as low as nanometer-sized particles to hundreds of microns and greater. Particle size may also be varied throughout the depth of the electrode. As such, particle size of the active material influences not only the amount of active material that may be deposited in the base layer, but the amount of binder as well and the amount of heat applied to initiate binding of the base layer.

According to the invention, device 118 may include a spray gun having an electrostatic charge applied thereto in order to guide and accelerate particles in spray 120 toward substrate 102. Known spray mechanisms include an electrostatic charge that is applied typically proximate a nozzle 128 of the spray gun 118 in order that the particles emitting from nozzle 128 are imparted with the charge, causing an electrostatic voltage differential to form between nozzle 128 and substrate 102. According to one embodiment, the electrostatic voltage applied to nozzle 128 is 25 kV, however the invention is not to be so limited and any voltage above or below 25 kV may be applied, such as 100 kV, according to the invention, in order that spray 120 is uniformly applied to substrate 102. The voltage differential may be enhanced by grounding a region of substrate 102 toward which spray 120 is directed. Because substrate 102 is caused to pass continuously through first application region 110, it may be inconvenient to directly ground substrate 102. Thus, according to the invention, a support structure 130 may be provided over which substrate 102 passes. Support structure 130 is stationary and in electrical contact with substrate 102, thus grounding of substrate 102 may be effected by providing a ground line 132 that is attached to support structure 130. According to one embodiment, multiple ground lines may be included (represented by a second ground line 134, but many may be included according to the invention) in order to more uniformly ground substrate 102 proximate where spray 120 impinges thereon.

System 100 includes second application region 112 which causes a second layer to be deposited onto substrate 102. Second application region 112 includes a device 136 (such as a spray gun or other known devices for causing a spray, as described) that causes spray 138 to emit toward substrate 102 and land or impinge on the first layer applied in first application region 110. Because adhesion from one electrode layer to the next tends to be easier to achieve compared to the initial base layer to substrate 102, spray 138 for the second and any subsequent electrode layers typically includes less binder. Thus, according to one embodiment of the invention, spray 138 includes 80-90% active material by weight (including but not limited to LTO, cobalt oxide, nickel oxide, manganese oxide, nickel cobalt manganese oxide, iron phosphate, iron oxide, carbon, and silicon), 4-8% conductive carbon by weight, and the balance as binder (PVDF in one embodiment). However the invention is not to be so limited, and for instance binder levels in the second electrode layer (and any subsequent layers) as well can be as low as 1% or as high as 100%. In fact, any composition and percentage thereof of active material and binder may be included, according to the invention, in the first layer and in the second and subsequent layers applied thereto.

According to the invention one or both heaters 140 may be included that provide heat to substrate 102. However, because substrate 102 already has a base layer thereon from first application region 110, heaters 140 may not be necessary as the base layer also provides a thermally insulating barrier to be formed. Also, heaters 140 may not be included because binding from one electrode layer to the next can be more effective and heat from a heater 142 may be adequate to cause the subsequent electrode material from spray 138 to reach a plastic state.

Heaters 140 (if used) and 142 may provide heat from any number of known methods, to include IR heaters, convective heaters, radiant heaters, or induction heaters, as examples. Further, device 136 may also include spray mechanism having a nozzle 144 to which an electrostatic charge may be applied as well, such as 25 kV. Application region 112 may include a support 146 and one or more ground lines 148 for enhancing the deposition of spray 138 onto the base layer previously applied.

According to the invention, system 100 includes a computer 150 with a computer readable storage medium and having stored thereon a computer program comprising instructions to execute control commands via a controller 152. In such fashion, controller 152 can be caused to control operation of the spray stations, heaters, and roller mechanism as known in the art and as described according to the operation above.

Figure 2:
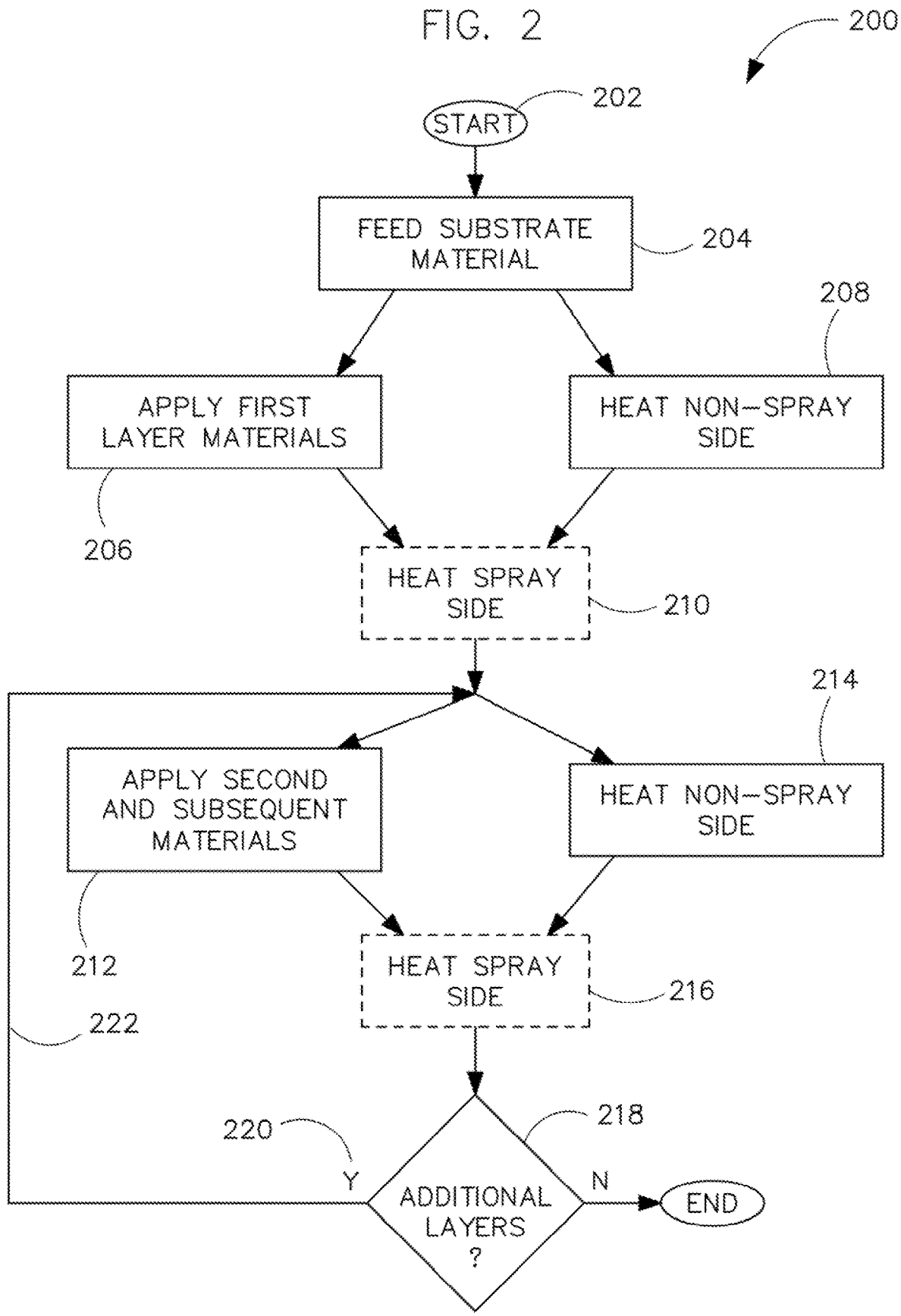
FIG. 2 illustrates steps for applying a base layer to an electrode substrate and one or more electrode layers of active material thereto according to embodiments of the invention.

The operation of system 100 of FIG. 1 can be summarized in a set of steps within a block diagram 200 as illustrated in FIG. 2. Starting at step 202, a substrate material is fed 204 and a first layer or base layer of binder, conductive carbon, and active material is applied onto the substrate at step 206. Heat is applied to the non-sprayed side of the substrate at step 208 and, as stated, may include a heater immediately opposite the location of the spray at step 206 and simultaneous therewith, and/or heat may be applied to the non-sprayed side of the substrate after the substrate is caused to pass through a region or zone where the base layer is applied. The spray side may then be heated at step 210 after which a first layer is formed on the substrate. A second layer of binder, conductive carbon, and active material is sprayed onto the first layer at step 212. As stated, the non-spray side may be heated 214 with heaters immediately opposite the second spray region, or subsequent thereto as represented by heaters 140 of FIG. 1. Heat may also be applied to the spray side 216 in order to cause the binder of the second layer to reach a plastic state/condition. As alluded to, subsequent layers may be applied to the electrode layers by repeating the process described. That is, referring to FIG. 1, additional spray stations such as second application region 112 may be included, generally without limit, within system 100 in order to add additional layers. Thus, at step 218, if additional layers are desired 220, block diagram 200 illustrates a return 222 in order that subsequent layers may be added. In other words, return 222 does not represent physically returning the part through second application region 112 but instead illustrates that system 100 may include numerous spray stations in its design in order to obtain a final desired thickness.

As also alluded to, each of the subsequent spray stations may include a spray mix of different quantities of binder, conductive carbon, and active material, depending on the design of the desired final electrode. As known in the art, it may be desirable in one example to have a gradient of particle sizes within a depth of an electrode where the smallest active material particles are nearest the substrate and the largest active material particles are toward the outer surface of the electrode. Conversely it may be desired to have larger particles proximate the substrate and smaller particles toward the outer surface of the electrode. Or, it may be desirable to have a uniform active material particle size throughout the electrode. Such designs are generally understood within the art and all may be formed according to embodiments of the invention. That is, thickness of each layer as well as particle size within each layer may be selected and controlled as subsequent layers are added during the formation of the electrode in order to achieve the desired particle size gradient of active material within the electrode.

There may be several advantages to being able to build up amorphous layers of varying material particle size or having different active materials in an electrode. In one example layering larger particle sizes closer to the current collector, and progressively smaller particle sizes as the electrode thickness is built up away from the current collector, may allow for higher power and higher energy density and cycle life as compared to an electrode built from a single, bimodal or trimodal particle size distribution that has been processed through a solvent cast method with a given binder. The process described would also allow for varying the binder and conductive additives as necessary to optimize the performance of the electrode for a given application. This would change the electrode active material matrix from an amorphous to more or less discreet layers with excellent interfacial conductivity.

This ability to layer without causing interfacial resistance is a significant improvement over conventional solvent based technology and other known methods. The layering method described in this invention is such that interfacial resistance is not apparent as one experienced in the art would expect. In fact the resistance or impedance is lower than is expected demonstrating that the method being disclosed is superior to that of solvent based methods of applying active material to a current collector and is a significant improvement to the art.

Figure 3:
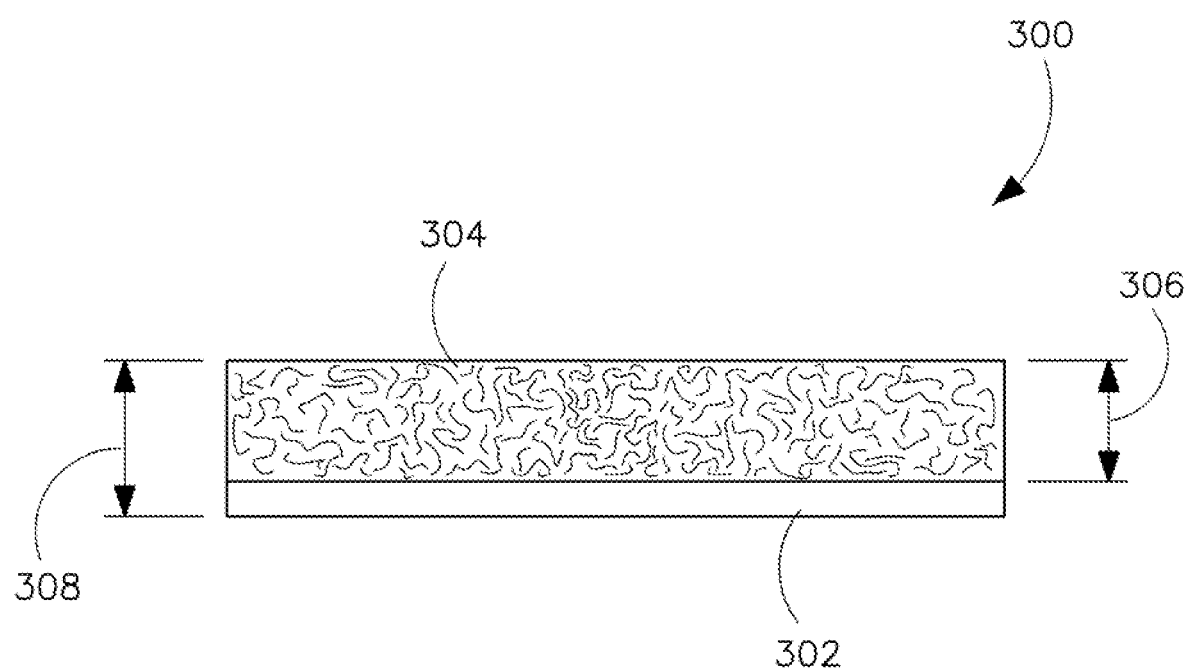
FIG. 3 illustrates a base layer having an electrode formed thereon using an embodiment of the invention.

Referring now to FIG. 3, electrode 300 includes a substrate 302 that corresponds to substrate 102 of FIG. 1. Electrode 300 includes one or more layers of active material mix in binder 304 and, as stated, may include a gradient of particle thicknesses throughout a thickness 306 thereof. Electrode 300 may also have a total thickness 308 that is controlled by selectively applying the appropriate number of layers as well as by compressing the substrate and layers as the finished product passes through guide mandrels 114 as illustrated in FIG. 1. According to the invention therefore, final single-sided electrode thicknesses of 0.0005" to 0.015"

or greater may be fabricated. In fact there is in principle no limit to how thin or how thick the electrode thicknesses may be. In terms of thinness, a layer as thin as a single active material size may be achieved. In terms of thickness, limitations are based only on the number of application stations and perhaps based on more fundamental limits tied to electrochemical performance.

Figure 4:
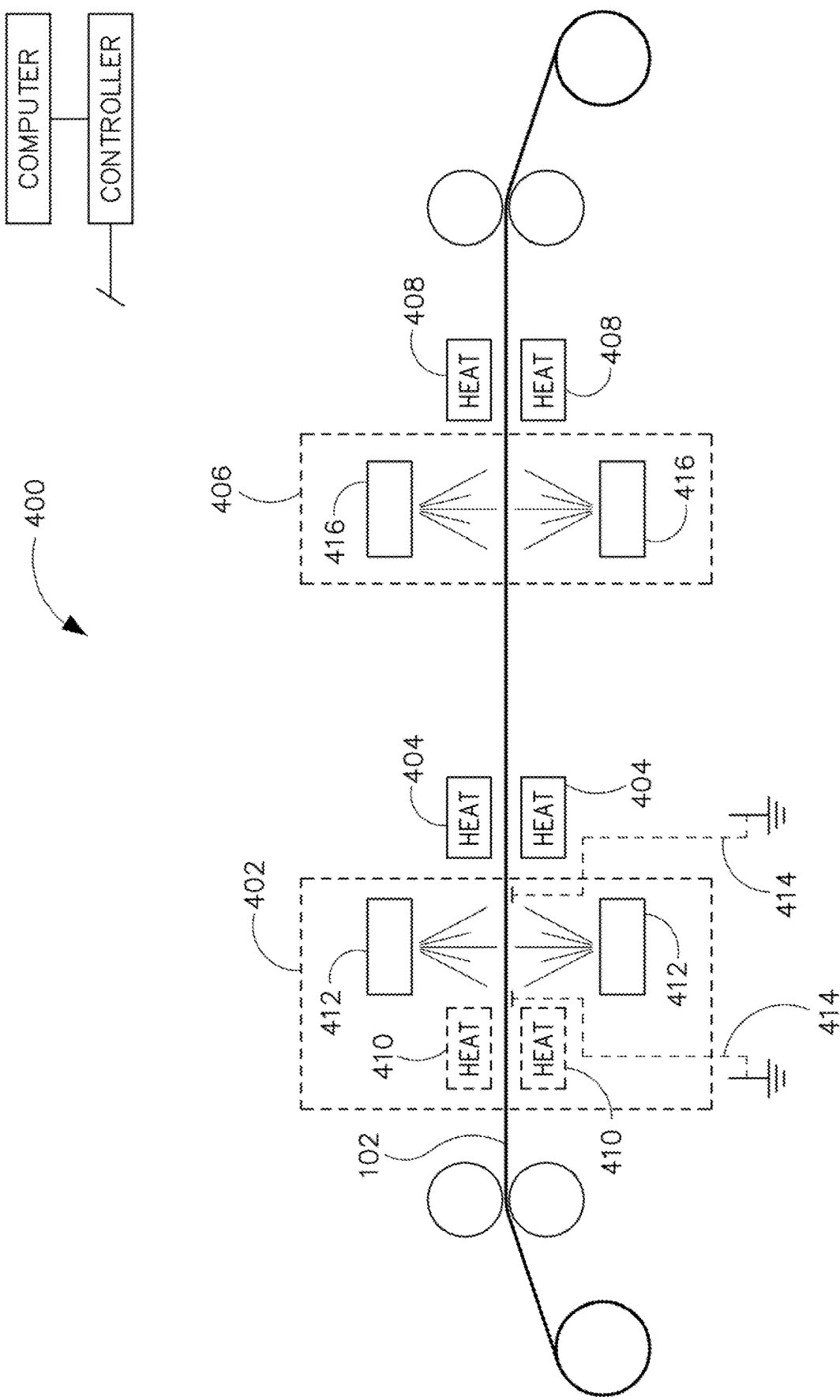
FIG. 4 illustrates components of a system for forming active electrode materials on two sides of an electrode substrate, according to an embodiment of the invention.
Figure 5:
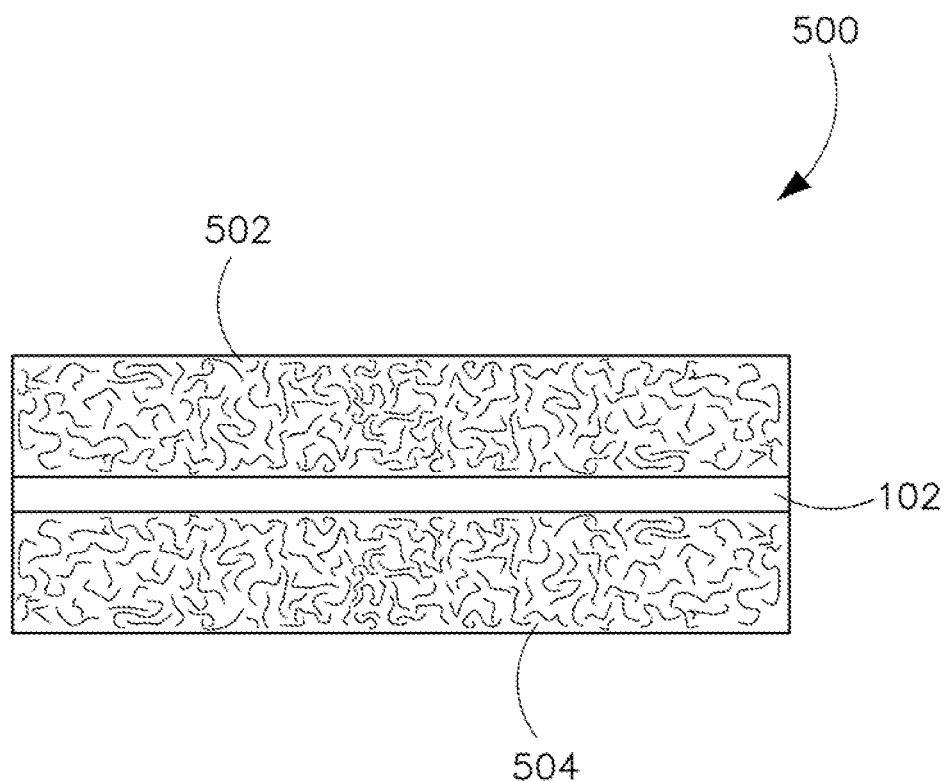
FIG. 5 illustrates a base layer having an electrode formed on two sides of an electrode substrate using embodiments of the invention.

The principles described above with respect to FIGS. 1 and 2 can be applied in order to fabricate two-sided electrodes. That is, a substrate may be passed through a system in which spray is applied to both sides of the substrate and subsequent layers in order to cause active material build-up on each side of the substrate. Referring now to FIG. 4, in double-sided coating system 400, substrate 102 may be caused to move through a first double-sided coating station 402 to spray initial layers on each side of substrate 102. System 400 includes heaters 404 and a second spray station 406 that is illustrative of stations that can be used, in conjunction with additional heaters 408 corresponding to a respective spray station 406. In other words, as with system 100 of FIG. 1, multiple spray stations may be included within system 400 in order to form multiple subsequent layers in building up the double-sided electrode. System 400 may include heaters 410 on one or both sides of the substrate that cause the substrate to be pre-heated and thereby enhance heating of the substrate prior to spraying of the base layers on each side, thereby enhancing adhesion of the base layers to the substrate 102. Spray mechanisms 412 may include electrostatic charge or not, and one or more corresponding ground lines 414 may be included as well. Heaters 410 and spray stations 412 may be staggered and offset from one another, or positioned such that one of heaters 410 is opposite one of spray stations 412, and the other of heaters 410 is opposite the other of spray stations 412, according to the invention. Second spray station 406 likewise includes spray mechanisms 416 that may or may not be electrostatically controlled, as well as grounded via ground lines to the substrate (not shown in spray station 406).

In such fashion a double-sided electrode 500 may be formed having substrate 102 and first active material layer 502 and second active material layer 504 formed thereon. As with the single sided embodiment, particle size gradients and overall thickness can be controlled using the appropriate particle size within each spray station and using compression mandrels 418. According to the invention therefore, final double-sided electrode thicknesses of 0.0010" to 0.030" or greater may be fabricated.

According to one embodiment, a metal belt 154 may be added to the coating systems such as system 100 of FIG. 1. The metal belt may extend the length of the system over which the substrate is caused to pass. That is, instead of using individual support structures 130 and 146, a single belt may be provided to enhance grounding in the spray area(s) as the substrate moves through. This may be of particular interest when less conductive materials are used such as thin metals, composite structures, open weave, foam-like, or non-woven substrates. Also, when small run lots of electrodes are desired, with the steel belt in place, the machine could be reversed to either build up electrode active material thickness or to possibly layer differing active materials to enhance final electrochemical performance. Another benefit of using a belt machine would be to allow free standing films of active material to be made using the method so that these films could be used in other applications where a strong bond to a substrate or current collector is not as strongly needed in the product design. The belt machine would also allow for faster change over from electrode types.

Dual coating can be achieved by either applying active material on both sides at once (i.e., FIG. 4), or by repeating single sided coating by rolling or flipping the web (i.e. re-running through the embodiment of FIG. 1 with the reverse side of substrate 102 coated) and whether in a vertical or horizontal fashion and either repeating the application zones or revisiting the application zones. That is, although FIGS. 1 and 4 illustrate substrate 102 passing orthogonal to the earth gravitational field, according to the invention the substrate may be passed collinear with the gravitational field. In other words, the system for coating may drive the substrate in a vertical direction according to embodiments of the invention. Other methods to do the same would be to either make a longer machine with more stations or coil and uncoil the web again passing through in the same direction, or taking the web back over the machine to save space. Lithium ion electrodes are therefore fabricated without solvents, which perform as well as conventionally made electrodes using solvent processes. The electrodes can be made at any thickness, density and with any known active materials.

Electrode density is also be adjustable and controllable. A solvent-cast electrode typically includes coining to gain or improve performance. According to the invention, both coined and un-coined electrodes are fabricable from the process with no apparent difference in performance. A solvent cast system normally targets a 30-40% open structure after coining, and relaxation with cycling and polymer solvation will move the porosity back to the 50% range. However, the process illustrated herein creates porosities from 15% to 50% with or without secondary coining. Not having to coin and experience the relaxation after solvation with electrolyte addition thus improves overall cycle life. Further, the amount of binder is lowered in the internal structure of the active material relative to a solvent cast system. In a solvent cast system the polymer binder often enters the internal structure of the active material. However, the process described maintains the majority of the binder on the outside of the active materials, resulting in higher utilization of the active material when compared with the solvent cast systems.

In a solvent cast line, the solvent, normally N-Methyl-2-pyrrolidone (NMP), or methyl ethyl ketone (MEK), or other known solvents, are typically added to the active material and then removed at a rate which does not cause cracking or flaking of the cast electrode. This typically includes extensive drying ovens and solvent recovery systems. Sometimes the solvent will be used as part of the fuel to heat the oven. Either way the requirement to remove the solvent creates the need for extensively long drying ovens, >200 feet, and other chemical handling equipment. Eliminating solvents in the casting process also reduces the possibility of contaminating the electrolyte and cell when proper airing time is not available.

Finally, the process illustrated herein does not alter the existing battery chemistry. The same binders, active materials and conductive additives are used as in conventional solvent-based methods, with no other ingredients added. That is, the performance of the electrode in terms of resistance, power, and fade rate are comparable to batteries formed in a solvent-based system.

The process illustrated herein is not limited to very thin electrodes. Finished electrode thickness range from 0.0005" to over 0.015" (single sided, and approximately double the thickness for double-sided electrodes) and thicker electrodes are possible, limited to an extent only by the number of layering stations. Further, the process is not limited to battery electrodes but may be extended to manufacturing a separator layer in a similar fashion, enabling a full cell to be manufactured on one line approaching a just-in-time delivery capability.

According to an embodiment of the invention, a method of forming a separator layer on the electrode is provided that utilizes the same process, binders, temperatures, and operating conditions used in the solvent-free electrode coating process described above. The method attaches/forms a ceramic separator to/on the surface of the electrode so that it flexes with the electrode and can be rolled or cut as one would a typical electrode, therefore eliminating the need to use/manufacture a separate/distinct polyolefin separator. The method can be used with both, rechargeable lithium cells or primary cells, and can be put on either electrode or both— i.e., on the anode and/or the cathode.

Figure 6:
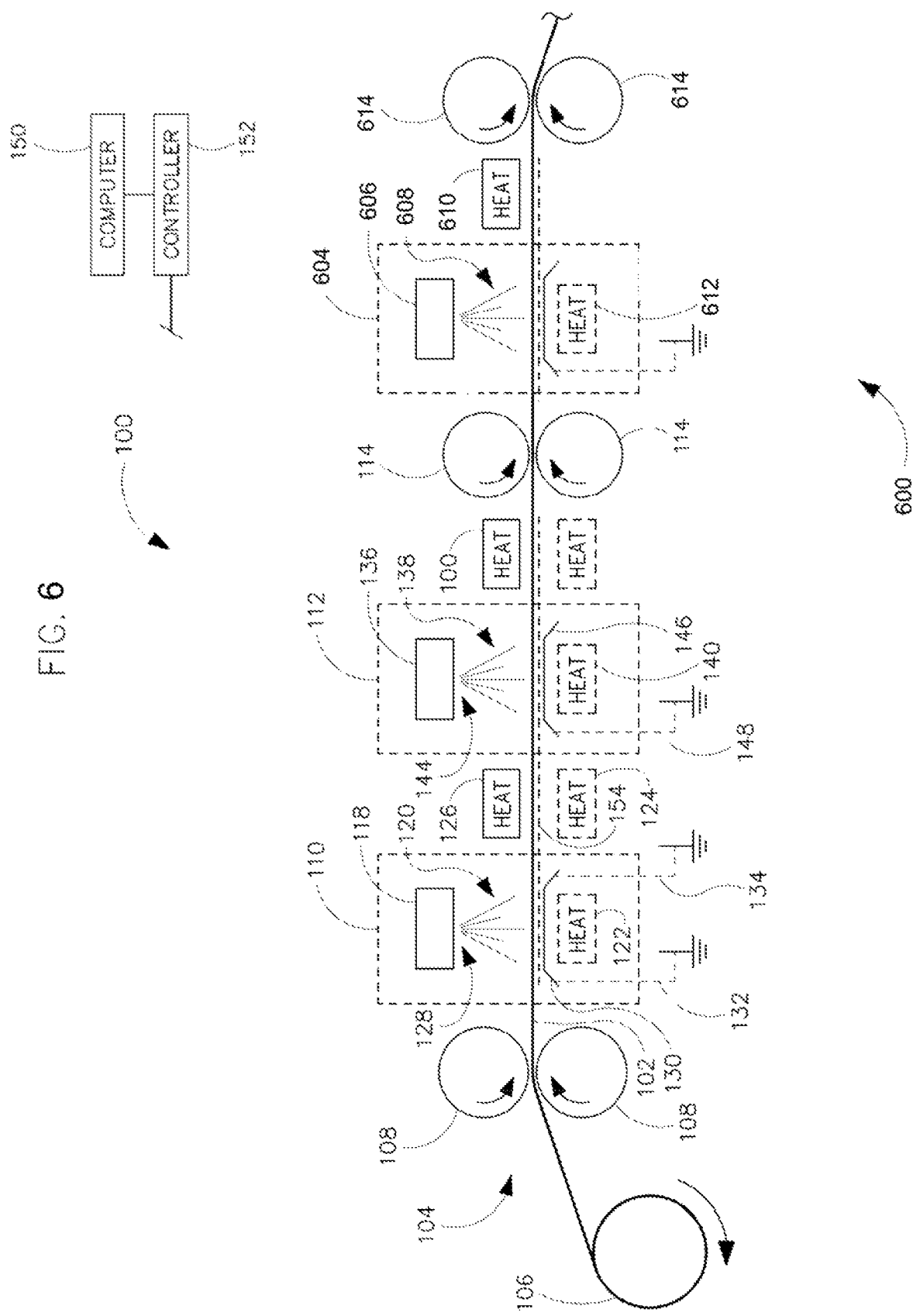
FIG. 6 illustrates components of a separator system for applying a separator layer to an electrode, with the separator system being integrated with the system of FIG. 1, according to an embodiment of the invention.

Referring now to FIG. 6, a system 600 and associated method for fabricating and applying a battery separator onto an electrode is shown according to an embodiment. While FIG. 6 illustrates the separator system 600 as being integrated with a system for fabricating electrodes by depositing binder and active electrode material on one side of a substrate or current collector (i.e., the system 100 of FIG. 1), it is recognized that the separator system 600 could be provided as a standalone system separate from system 100. Thus, solvent cast electrodes or sprayed electrodes could be provided to system 600 for subsequent application/formation of a separator thereon.

The separator system 600 includes a feed mechanism (illustrated in FIG. 6 as rollers/mandrels 114) that provides finished electrodes (solvent cast or sprayed electrodes, for example) to an application region 604 of the system where a separator layer is to be applied. In the application region, a device 606 for applying the separator layer to the fabricated electrode is provided, with the device comprising a spray mechanism (such as a spray gun or other known devices for causing a spray) that is configured to spray 608 a layer of a mix of material onto the electrode. In general, although the device 606 is described hereafter as a spray mechanism or gun in order to apply material onto the electrode, and such is illustrated as "spray 608", it is contemplated that any dry dispersion application mechanism technique may be employed to apply the separator layer to the electrode. Such dry dispersion techniques used to apply the separator material may include: brushing, powder coating, using a fluidized bed, doctor blading, or wiping with a rag, as examples.

According to an exemplary embodiment, the device or spray mechanism 606 causes spray 608 to emit between approximately 2 and 20 psi. The spray 608 is a ceramic-based separator spray mixture that is comprised of a binder and an electrically non-conductive ceramic separator material. According to one embodiment of the invention, the binder may consist entirely of a thermoplastic or a thermoset material, which in an exemplary embodiment is polyvinylidene fluoride (PVDF) or any derivative thereof, although it is also envisioned that the material may instead be PTFE or any derivative thereof. According to another embodiment of the invention, the binder may include a thermoplastic or a thermoset material (e.g., PVDF) along with a polyolefin filler material (such as polyethylene or polypropylene) to add structural integrity to the binder. The PVDF may range between 2-30% by weight of the total material in spray 608, with it being recognized that the exact percentage is dependent (in part) upon the surface area and pore size of the separator material along with the characteristics of the binder when melted or softened (i.e., whether it also includes a filler material). As known in the art, thermoplastics are a polymer that becomes pliable above a certain temperature, and returns to a solid stated upon cooling. In contrast and as also known in the art, a thermoset material forms an irreversible chemical bond during the curing process, which breaks down upon melting (and does not reform upon cooling).

The ceramic separator material of the spray mixture includes one or more ceramic powders, including one or more of alumina, magnesium oxide (MgO) aluminum oxide, tin oxides, or other ceramics, with sizes of the ceramic powder(s) being in the range of 1-25 μm. It is recognized that other insulating ceramic materials can be used alternatively to the materials listed above. As one example, silicon dioxide ($SiO_2$)-based materials may be used, but it is recognized that $SiO_2$ is not stable in contact with the negative electrode materials, especially at elevated temperature.

In one embodiment, the spray 608 is applied not only to top and/or bottom surfaces of the electrode, but also to edges of the electrode. In applying the ceramic-polymer separator mixture to the edges of an electrode, the device or spray mechanism 606 is controlled to provide a spray 608 that over-sprays the electrode to make a border on the edge of the electrode, so as to prevent shorting around the edges of electrode pairs. The overlap edges may be up to 0.125" (3.2 mm), although less than 0.039" (1 mm) is typical for a separator overlap.

According to the invention, the electrode is heated in order to initiate binding of the ceramic-polymer separator mixture to the electrode. In one embodiment, a heater 610 is positioned opposite device 606 and adequate power is provided to heater 610 to raise the temperature of the electrode to between approximately 150° C. to 300° C., based on the utilized polymer binder. However, in another embodiment, a heater 612 is positioned to heat a surface of the electrode opposite a surface of the electrode to which spray 608 is applied. Thus, according to the invention, a layer of separator material is applied to electrode and binding thereto is initiated via one or both heaters 610, 612. Heaters 610, 612 may apply heat through any number of known mechanisms, including infrared (IR) heaters, convective heaters, conductive heaters, radiant heaters (for instance, outside the IR spectrum), or induction heaters, as examples. The heater 610 (and optionally heater 612) function to operate so as to heat the binder to a temperature (i.e., 150° C. to 300° C.) such that the polymer therein is softened but not heated to the point that the polymer readily flows, as it is recognized that if the polymer flows too readily it moves into particle pores of the separator material and adhesion and cohesion is lost.

The application of the ceramic-polymer separator mixture onto electrode via spray 608 (or another suitable application means) and the associated heating thereof results in formation of a separator layer. As shown in FIG. 6, separator system 600 also includes a set of mandrels or rollers 614 designed to have a space or gap therebetween that is maintained during operation in order to provide gapped calendaring to the separator layer after the depositing of spray and heating thereof, with the calendaring ensuring a smooth, uniform finish and thickness of the separator layer. The mandrels 614 thus compress and calendar the substrate layer to a final desired and consistent thickness, density, porosity and tortuosity. According to an exemplary embodiment, a targeted thickness of the separator layer will be in the range of ceramic particle sizes, with the separator layer ideally being as thin as possible so as to reduce the impedance thereof-with a thickness of less than 25 μm being achievable based on the thickness corresponding to a single particle size thickness of the utilized ceramic separator material. The specific tortuosity and porosity of the separator layer are controlled by the exact settings of the spray and subsequent calendaring.

As shown in FIG. 6, a controller 152 is provided to control operation of the spray station 606, heater(s) 610, 612, and roller mechanism 614 as known in the art and as described according to the operation above. While controller 152 is shown as being common to both system 100 and separator system 600, it is recognized that a separate controller (distinct from a controller associated with system 100) could be used for operating separator system 600.

Figure 7:
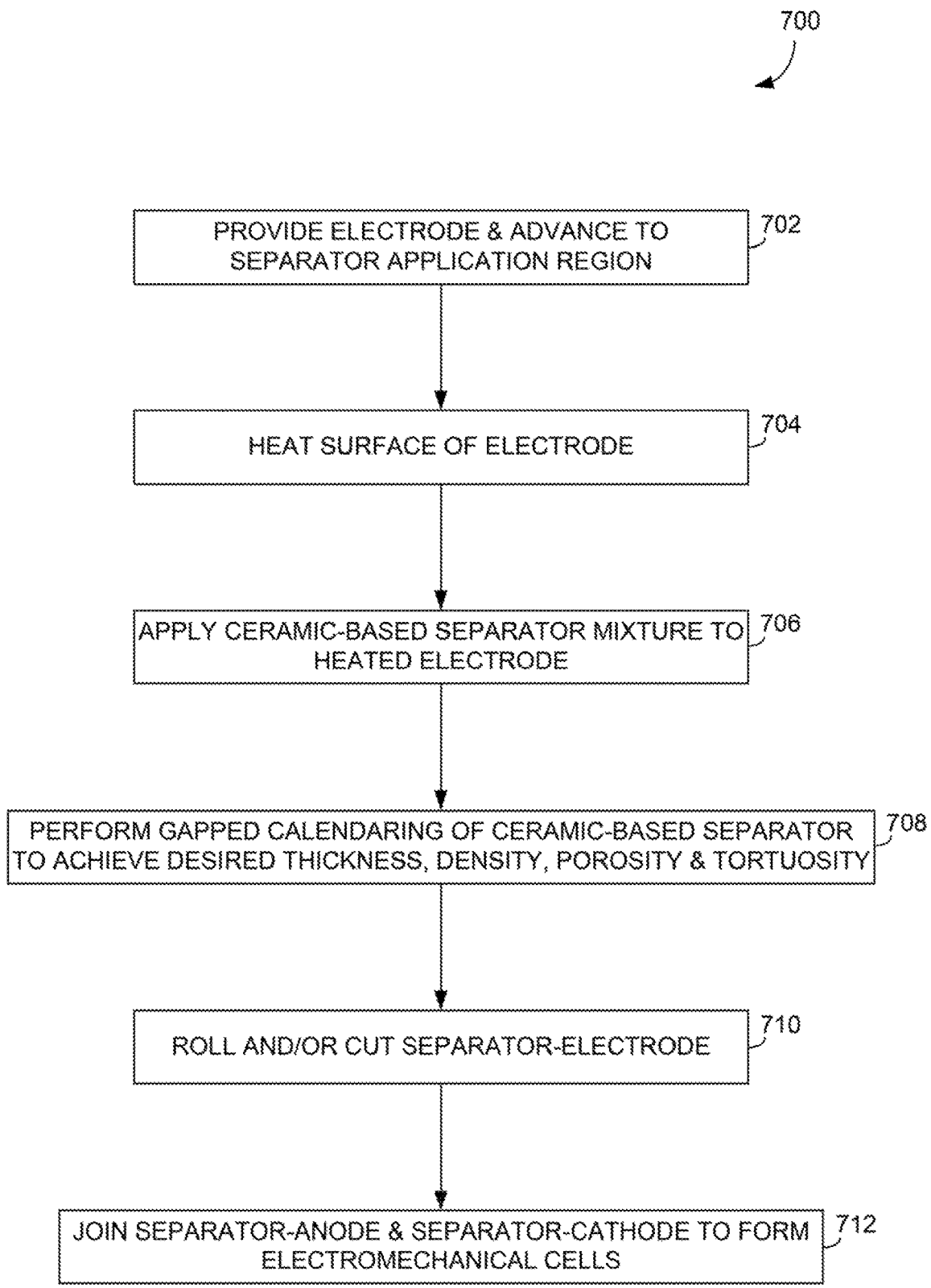
FIG. 7 illustrates a dry, solvent-free method for applying a battery separator onto an electrode, according to an embodiment of the invention.

Referring now to FIG. 7, a dry, solvent-free method 700 for applying a battery separator onto an electrode is shown according to an embodiment. In STEP 702, an electrode is initially provided and advanced toward a separator application region—with such electrode being fabricated as a solvent cast electrode or a sprayed electrode (as described in detail above). At STEP 704, the surface of the electrode is heated via any of a number of known methods, including infrared (IR) heating, convective heating, conductive heating, radiant heating (for instance, outside the IR spectrum), or induction heating, as examples.

Upon heating of the electrode surface, a ceramic-based separator mixture is applied to the electrode at STEP 706 via a dry, solvent free application method-with the mixture being applied so as to cover the surface of the electrode. The ceramic separator mixture is composed of a binder and an electrically non-conductive ceramic separator material, and while the binder and separator material are described here as a "mixture" that is applied together via a single application, it is recognized that a separate binder and ceramic separator material could be applied simultaneously but via separate applications. According to one embodiment of the invention, the binder may consist entirely of a thermoplastic or a thermoset material, which in an exemplary embodiment is polyvinylidene fluoride (PVDF) or any derivative thereof. According to another embodiment of the invention, the binder may include a thermoplastic or a thermoset material (e.g., PVDF) along with a polyolefin filler material—which may be polyethylene (PE), polypropylene (PP), or fibers thereof—to add structural integrity to the binder. The PVDF may range between 2-30% by weight of the total material in the separator mixture, with it being recognized that the exact percentage is dependent (in part) upon the surface area and pore size of the ceramic separator material along with the characteristics of the binder when melted or softened (i.e., whether it also includes a filler material).

The ceramic separator material of the separator mixture includes one or more ceramic powders, including one or more of alumina, magnesium oxide, aluminum oxide, tin oxides, or other ceramics, with sizes of the ceramic powder(s) being in the range of 1-25 µm. It is recognized that other insulating ceramic materials can be used alternatively to the materials listed above. According to exemplary embodiments of the invention, the ceramic material may be dependent on whether the electrode to which the ceramic-based separator mixture is being applied is a cathode or an anode. As an example, the ceramic separator material may be magnesium oxide when the electrode is a cathode and the ceramic separator material may be aluminum oxide when the electrode is an anode.

In an embodiment where the binder consists entirely of PVDF (or another thermoplastic or a thermoset material), the separator mixture is comprised of 3%-20% PVDF and 97%-80% ceramic separator material. When the binder consists of PVDF (or another thermoplastic or a thermoset material) and a filler material, the separator mixture is comprised of 3%-15% PVDF, 5%-40% filler material (polypropylene or polyethylene), and 45%-92% ceramic separator material.

With respect to the dry, solvent free application of the ceramic-based separator mixture to the electrode performed at STEP 706, an overspraying application may be performed where the separator mixture is applied not only to top and/or bottom surfaces of the electrode, but also to edges of the electrode. In applying the ceramic-based separator mixture to the edges of an electrode, the application thereof is controlled to provide a spray that over-sprays the electrode to make a border on the edge of the electrode, so as to prevent shorting around the edges of electrode pairs.

Figure 8:
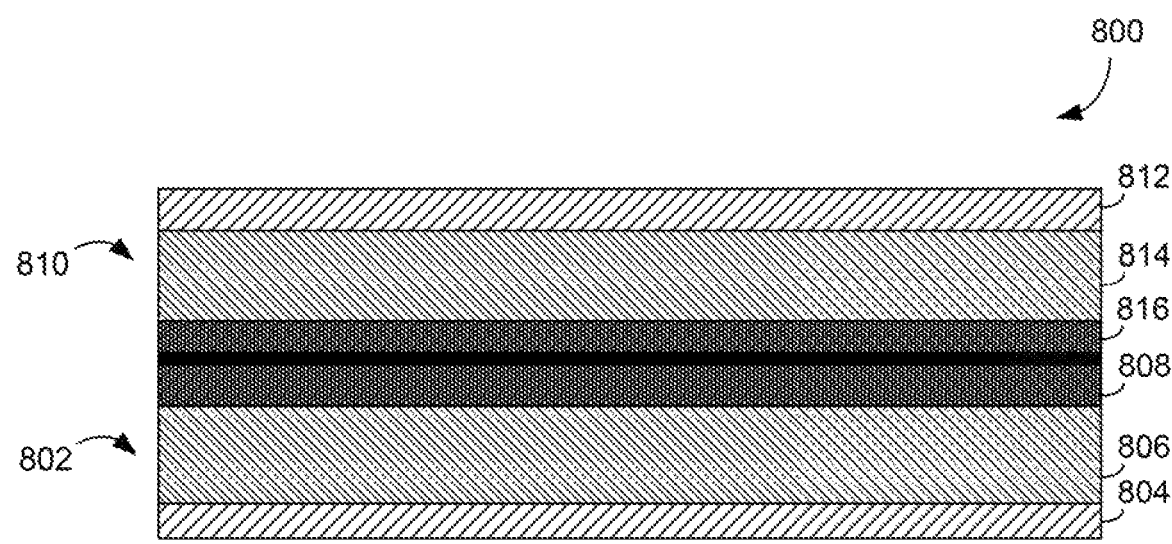
FIG. 8 illustrates an electrochemical cell resulting from combining an anode-separator structure and a cathode-separator structure, according to an embodiment of the invention.

Referring still to FIG. 7, upon completion of the dry, solvent free application of the ceramic-based separator mixture to the electrode, a gapped calendaring is performed at STEP 708 to compress and calendar the applied ceramic-based separator to a final desired and consistent thickness, density, porosity and tortuosity. The resulting structure thus provides a ceramic separator on the surface of the electrode that can flex along with the electrode—with a subsequent step of rolling and/or cutting the resulting separator-electrode at STEP 710 thus being made easier, as it is similar to the rolling and/or cutting of a typical electrode. Additionally, upon any optional rolling and/or cutting that is performed, resulting separator-electrode structures may be joined together (i.e., anodes and cathodes may be joined together) at STEP 712 to form electrochemical cells in which tearing and shorting due to separator misalignment may both be minimized/eliminated. An electrochemical cell 800 resulting from such joining together is illustrated in FIG. 8, with it being seen therein that an anode structure 802 including a copper current collector 804, anode active material 806, and ceramic separator 808 is joined to a cathode structure 810 including an aluminum current collector 812, cathode active material 814, and ceramic separator 816.

Beneficially, application of a ceramic-polymer separator mixture to an electrode via the method described above provides a battery separator that exhibits improved performance over existing battery separators. The ceramic-polymer separator mixture includes a lower amount of binder (i.e., 2-30% by weight) than conventional commercial battery separators, which is advantageous to the battery industry because the lower amount of binder lessens the likelihood of thermal escalation during a thermal runaway event. That is, the lowering of the amount of polymer binder in the separator inhibits the initiation of thermal runaway by reducing the available immediate energy to start the electrolyte decomposition, such that the ceramic separator structure will then collapse upon itself further reducing the shorting to occur. The polymer binder, as it is heated, will be pulled into the pores of the separator material (e.g., MgO), sequestering it from participating in the thermal runaway reaction. Accordingly, the battery separator (and method of forming thereof) of the present invention lessens the likelihood of thermal escalation during a thermal runaway event, making such an event less likely to occur or at the very least slowing thermal escalation enough so that it does not reach the maximum catastrophic release of energy, minimizing the amount of energy a battery system would need to dissipate and significantly improving the overall safety of the battery.

An additional benefit of applying a ceramic-polymer separator mixture to an electrode via the method described above is that such an application provides lower cost and easier handling of electrode pairs when assembling a battery.

That is, unlike an individual separator which slips and requires constant tension to wind properly, the ceramic separator applied via the above described method remains attached to the electrode. This facilitates better web control when aligning during operations such as making jelly rolls for cylindrical cells, or cell stacking when making prismatic or pouch cells, whether flat winding or utilizing individual electrode components.

A technical contribution for the disclosed method and apparatus is that it provides for a computer implemented method and apparatus for applying a battery separator to electrodes and, more particularly, to a method and apparatus for manufacturing or applying a ceramic separator to lithium electrochemical cells in a lithium-ion (Li-ion) battery.

One skilled in the art will appreciate that embodiments of the invention may be interfaced to and controlled by a computer readable storage medium having stored thereon a computer program. The computer readable storage medium includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

According to one embodiment of the invention, a method of applying a dry, solvent-free ceramic-based separator to an electrode includes providing an electrode to an application area via a feed mechanism and applying a separator layer comprised of a binder and an electrically non-conductive separator material to the electrode via a dry dispersion application, wherein the binder includes at least one of a thermoplastic material and a thermoset material.

According to another embodiment of the invention, a method of manufacturing a battery cell that includes an electrode and a separator includes providing an electrode, advancing the electrode toward an application region, and coating a mixture of an electrically non-conductive ceramic-based separator material and a binder onto the electrode in the application region via a dry, solvent-free coating process, so as to form a separator layer.

According to yet another embodiment of the invention, a battery cell includes an electrode and a separator layer adhered to the electrode, the separator layer comprising a binder comprising at least one of a thermoplastic material and a thermoset material and an electrically non-conductive ceramic-based separator material, wherein the separator layer ranges from 2-30% binder by weight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of applying a dry, solvent-free ceramic-based separator to an electrode, the method comprising:
   providing an electrode to an application area via a feed mechanism;
   applying a separator layer comprised of a binder and an electrically non-conductive separator material to the electrode via a dry dispersion application, wherein the binder includes at least one of a thermoplastic material and a thermoset material; and
   heating the electrode to adhere the separator layer to the electrode;
   wherein applying the separator layer comprises spraying the binder and the electrically non-conductive separator material onto the electrode at between 2 and 20 pound-force per square inch (psi).

2. A method of manufacturing a battery cell that includes an electrode and a separator, the method comprising:
   providing an electrode;
   advancing the electrode toward an application region;
   coating a mixture of an electrically non-conductive ceramic-based separator material and a binder onto the electrode in the application region via a dry, solvent-free coating process, so as to form a separator layer; and
   heating the electrode to adhere the separator layer to the electrode, the electrode being heated prior to, during, and/or after coating of the mixture onto the electrode;
   wherein coating the mixture onto the substrate comprises powder coating the mixture of the separator material and the binder onto the electrode such that the separator layer is formed on the electrode as a distinct layer from the electrode; and
   wherein the mixture of the separator material and the binder is sprayed onto the electrode at a pressure of between 2 and 20 pound-force per square inch (psi).

* * * * *